Sept. 4, 1923.  1,466,754

T. M. REES

MACHINE FOR FORMING SPIRAL FLUTES

Filed Feb. 26, 1920   2 Sheets-Sheet 1

Inventor-
Thomas Morgan Rees,
By B. Singer, Atty.

Sept. 4, 1923.

T. M. REES 1,466,754

MACHINE FOR FORMING SPIRAL FLUTES

Filed Feb. 26, 1920    2 Sheets-Sheet 2

Patented Sept. 4, 1923.

1,466,754

UNITED STATES PATENT OFFICE.

THOMAS MORGAN REES, OF KEW GARDENS, ENGLAND.

MACHINE FOR FORMING SPIRAL FLUTES.

Application filed February 26, 1920. Serial No. 361,453.

*To all whom it may concern:*

Be it known that I, THOMAS MORGAN REES, a subject of the Kingdom of Great Britain, residing at 48 Defoe Avenue, Kew Gardens, in the county of Surrey, England, have invented certain new and useful Improvements in Machines for Forming Spiral Flutes, of which the following is a specification.

This invention comprises certain improvements in or relating to the mode of and means for forming spiral flutes or coarse thread formations on bars for the production of twist drills and for other purposes, in which the spiral flutes or the like are produced upon a rod or bar by forging between suitable hammer dies, the rod or bar to be forged being fed forward between the dies by the rotation of a member or part to which said rod is connected by a suitable chuck.

According to the present invention, the feeding of the rod or bar to be forged between the hammer dies is effected by the rotation of a spindle having flutes, spirals or threads formed thereon corresponding or coinciding with the flutes or twist to be forged upon the rod by the dies.

In this invention therefore, when it is desired to forge spiral flutes upon the rod, the rotatable feeding member to which the said rod is connected is also formed with spiral flutes corresponding with those to be forged, and a fixed bearing member furnished with internal flutes is provided for rotatably receiving the flute feeding spindle. The feeding spindle is rotated during the axial movement thereof, by means of a hand wheel furnished upon same.

In order that this invention may be clearly understood and readily carried into practice, reference may be had to the appended explanatory sheet of drawings, upon which:—

Figure 1:
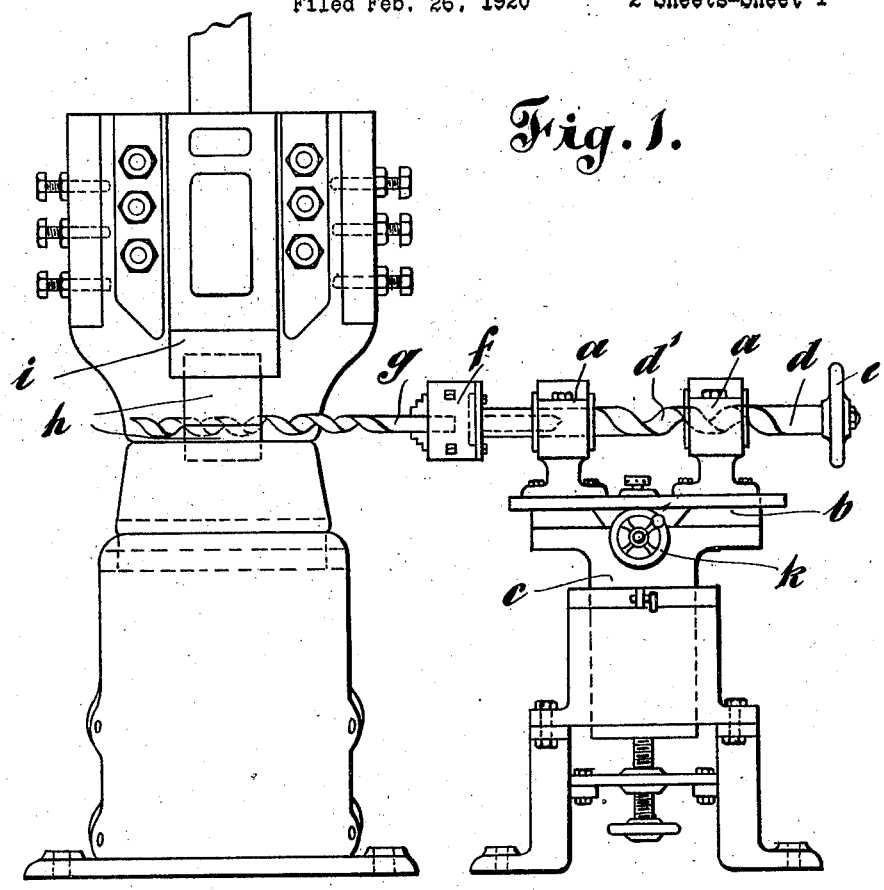
Figure 1 is a front elevation illustrating a suitable machine or apparatus for carrying out the present invention.
Figure 2:
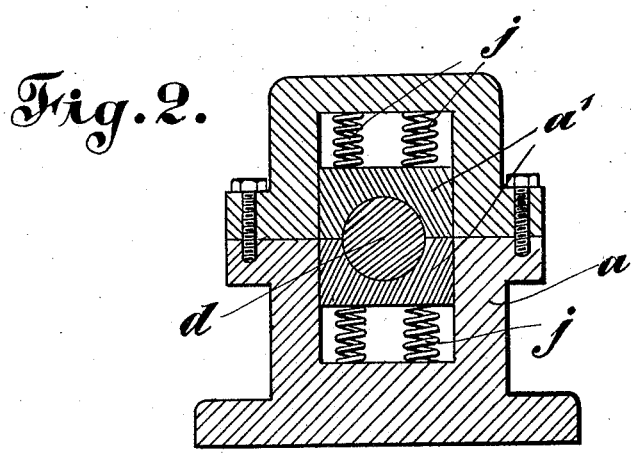
Figure 2 is an enlarged detail sectional view of one of the bearings for the feeding spindle.
Figure 3:
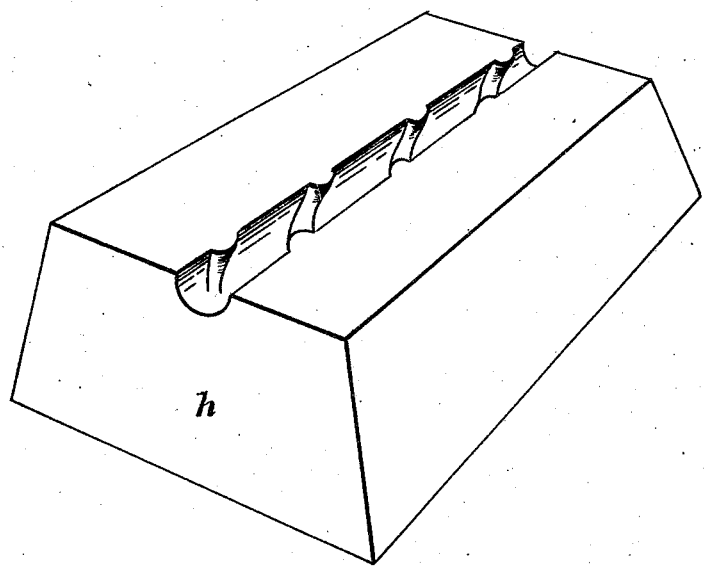
Figure 3 is a detail perspective view of one member of the split die.
Figure 4:
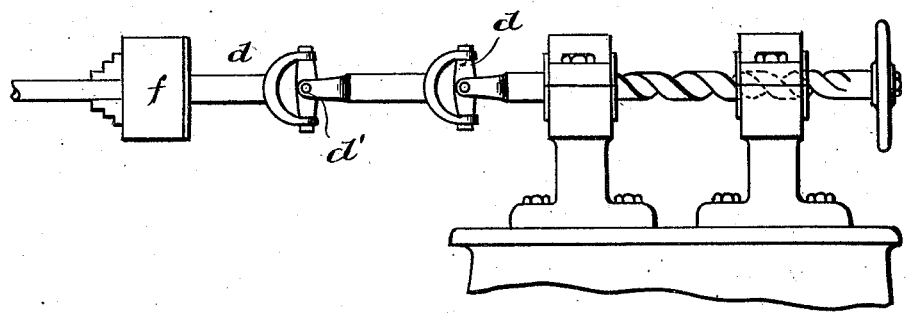
Figure 4 is an elevation showing a modified form of my invention.

In an embodiment of this invention the machine for feeding the bar consists of a form of headstock $a$ which is mounted on a longitudinal slide $b$, which slide $b$ is attached to a vertically sliding pillar $c$ which is adapted to allow of vertical and angular adjustment of the headstock $a$ such headstock carrying a spindle $d$ having a master spiral or screw thread $d^1$ on one part of it, and being adapted to engage with a fixed tapping in the headstock $a$, formed to coincide with the spiral or screw thread to be forged. The rear end of the spindle $d$ is provided with a hand wheel $e$, while the front end of the spindle is provided with a suitable chuck $f$ for attachment to the end of the rod $g$ on which the spiral is to be formed, the whole being adapted to effect the feeding of the rod $g$ in between the split dies $h$ in a power hammer $i$, which dies $h$ are so formed as to produce the required spiral or twist on the rod $g$ as the spindle $d$ is slowly rotated and fed forward by the hand wheel $e$ during the forging of the rod $g$ between the dies in the hammer, the master spindle $d$ on its engagement with the fixed thread so controlling the feed as to give the correct lead to the rod $g$ at every stroke of the hammer.

The longitudinal slide $b$ below the headstock $a$ is provided for the purpose of enabling the quick adjustment of any length of rod to be forged, while the sliding pillar $c$ is adapted to be raised or lowered, so as to enable the machine to be set to the correct alignment of the dies $h$, and also for adjusting in an angular direction in case of the dies becoming slightly twisted after being keyed in the hammer. The headstock $a$ is also capable of a cross traversing movement at right angles to the longitudinal traverse of the spindle by the operation of hand wheel $k$.

The spindle bearings $a^1$ in the headstock $a$ are each formed in two parts and controlled both above and below the spindle by coiled springs $j$, so as to allow for vibration and distortion of the metal during the process of forging.

In lieu of or in addition to the spring mounted bearings $a^1$ the vibration and distortion of the metal during forging may be allowed for by the provision of two universal joints $d'$ in the spindle $d$, advantageously at a position adjacent to and at the rear of the chuck $f$, a short link being provided between the two joints. In this manner a positive feeding movement of the spindle and bar or rod would be effected while at the same time allowing for vibration and distortion.

The operation is as follows:—The heated bar being placed between the dies in the hammer the top die is set working, the first blow forming a part of the spiral, which spiral upon the revolving and feeding forward of the bar is formed to coincide with the required shape of the complete spiral, consequently it is necessary and essential that the feed should be in correct relation to the repeated blows of the hammer.

What I claim as my invention and desire to secure by Letters Patent is:—

1. Means for forming spiral flutes or coarse threads on bars or rods for the production of twist drills and for other purposes, comprising hammer dies, a feeding spindle mounted for rotation and provided with a master spiral, flutes or threads coinciding or corresponding with the flutes or twist to be forged upon the rod by the dies, and also provided with universal joints, and means for supporting the rod or bar and feeding same to the forging hammer, said supporting means being arranged for vertical, lateral, longitudinal and angular movement and adjustment.

2. Means for forming spiral flutes or coarse threads on bars or rods for the production of twist drills and for other purposes, comprising hammer dies, a feeding spindle mounted for rotation and provided with a master spiral, flutes or threads coinciding or corresponding with the flutes or twist to be forged upon the rod by the dies, and headstocks, bearings for said feeding spindle mounted for vertical movement in the headstocks, and springs exerting their tension against said bearings, permitting slight vertical vibration thereof, thereby allowing for distortion of the metal and absorbing vibration.

In witness whereof I have hereunto set my hand.

THOMAS MORGAN REES.